(12) United States Patent
Lee et al.

(10) Patent No.: US 11,689,793 B2
(45) Date of Patent: Jun. 27, 2023

(54) CAMERA MODULE WITH REDUCED BASE LINE IN DUAL CAMERA AND ELECTRONIC DEVICE HAVING THE SAME

(71) Applicant: Samsung Electronics Co., Ltd., Suwon-si (KR)

(72) Inventors: Kyeongeun Lee, Suwon-si (KR); Yongwook Jang, Suwon-si (KR); Wonchul Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/500,326

(22) Filed: Oct. 13, 2021

(65) Prior Publication Data
US 2022/0124232 A1 Apr. 21, 2022

(30) Foreign Application Priority Data
Oct. 15, 2020 (KR) .................. 10-2020-0133534

(51) Int. Cl.
*H04N 5/335* (2011.01)
*H04N 23/55* (2023.01)
(Continued)

(52) U.S. Cl.
CPC ............ *H04N 23/55* (2023.01); *G02B 7/021* (2013.01); *H04N 23/45* (2023.01); *H04N 23/54* (2023.01)

(58) Field of Classification Search
CPC combination set(s) only.
See application file for complete search history.

(56) References Cited

U.S. PATENT DOCUMENTS

| 7,652,836 B2 * | 1/2010 | Aoki | ............... G03B 17/28 |
| | | | 359/824 |
| 8,248,717 B2 * | 8/2012 | Chou | ............... G02B 7/021 |
| | | | 359/811 |

(Continued)

FOREIGN PATENT DOCUMENTS

| EP | 3606023 | 5/2020 |
| KR | 10-2010-0052083 | 5/2010 |

(Continued)

OTHER PUBLICATIONS

International Search Report and Written Opinion dated Feb. 9, 2022 in corresponding International Application No. PCT/KR2021/014109.

*Primary Examiner* — Gary C Vieaux
(74) *Attorney, Agent, or Firm* — Nixon & Vanderhye P.C.

(57) ABSTRACT

A camera module according to an embodiment of the disclosure may include: a Printed Circuit Board (PCB), a first image sensor and a second image sensor disposed on the PCB, a lens holder having an upper plate facing and spaced apart from the PCB and a sidewall extending from an edge of the upper plate toward the PCB, wherein the upper plate includes a first through-hole and a second through-hole aligned to the first image sensor and the second image sensor, respectively, a first lens assembly including a first lens system and a first barrel accommodating the first lens system, and assembled to the first through-hole to be aligned with the first image sensor, and a second lens assembly including a second lens system and a second barrel accommodating the second lens system, and assembled to the second through-hole to be aligned with the second image sensor. The first barrel may include a first sidewall coupled to the first through-hole and a second sidewall having a greater diameter than the first sidewall and located between the first through-hole and the first image sensor. The second (Continued)

barrel may include a third sidewall coupled to the second through-hole and a fourth sidewall having a greater diameter than the third sidewall and located between the second through-hole and the second image sensor.

14 Claims, 13 Drawing Sheets

(51) Int. Cl.
*G02B 7/02* (2021.01)
*H04N 23/45* (2023.01)
*H04N 23/54* (2023.01)

(56) References Cited

U.S. PATENT DOCUMENTS

| | | | |
|---|---|---|---|
| 10,348,978 B2* | 7/2019 | Lee | H04N 5/2258 |
| 10,410,061 B2 | 9/2019 | Kim et al. | |
| 11,350,020 B2* | 5/2022 | Tanaka | G02B 27/0012 |
| 2017/0082823 A1* | 3/2017 | Hwang | G02B 27/646 |
| 2018/0113378 A1 | 4/2018 | Wang et al. | |
| 2018/0234529 A1 | 8/2018 | Yu et al. | |
| 2020/0021720 A1 | 1/2020 | Wang et al. | |

FOREIGN PATENT DOCUMENTS

| | | | | |
|---|---|---|---|---|
| KR | 10-2018-0023172 | | 3/2018 | |
| KR | 20180023172 A | * | 3/2018 | |
| KR | 10-2018-0094247 A | | 8/2018 | |
| KR | 10-2019-0137657 A | | 12/2019 | |
| WO | 2019/228109 | | 12/2019 | |
| WO | WO-2019228109 A1 | * | 12/2019 | ............. G02B 13/02 |

\* cited by examiner

CAMERA MODULE WITH REDUCED BASE LINE IN DUAL CAMERA AND ELECTRONIC DEVICE HAVING THE SAME

CROSS-REFERENCE TO RELATED APPLICATION

This application is based on and claims priority under 35 U.S.C. § 119 to Korean Patent Application No. 10-2020-0133534, filed on Oct. 15, 2020, in the Korean Intellectual Property Office, the disclosure of which is incorporated by reference herein in its entirety.

BACKGROUND

Field

The disclosure relates to a technique for a camera module. For example, the disclosure relates to a technique for a camera module including two image sensors.

Description of Related Art

With the development of mobile communication technologies, an electronic device has recently been changing to be easily carried and freely accessible to a wired/wireless communication network.

Meanwhile, there is ongoing research and development for maximizing an area of a display which outputs visual information in the aforementioned electronic device. In an electronic device including a full front display in which a display occupies most of a front face of the electronic device, a camera may be disposed below the display.

In addition, the electronic device may employ a camera module having two image sensors. The electronic device may synthetize image data obtained from the two image sensors to improve quality of an image obtained through the camera.

In addition, in order to increase transmittance of a portion of the display, corresponding to a Field Of View (FOV) of the camera, some pixels may be removed from a display panel of the portion.

In an electronic device, a disparity between a plurality of camera modules (e.g., two cameras) may be increased with an increase in a distance between a plurality of lens axes (e.g., two lens axes) provided in the plurality of camera modules (e.g., a dual camera module), for example, a length of a base line of a dual camera. For example, when the disparity increases, a Field Of View (FOV) shared by the two cameras decreases, which may result in a decrease in an amount of data that can be used for image synthesis.

When a luminance of the display increases in the electronic device, there may be a problem in that a difference in color or brightness increases between a portion configured to have a low pixel density for high transmittance and the remaining portions in the display.

SUMMARY

Embodiments of the disclosure provide an electronic device in which a length of a base line in a plurality of camera modules (e.g., a dual camera) may be reduced.

Embodiments of the disclosure provide an electronic device in which a plurality of camera modules (e.g., a dual camera) may be used to obtain an image of good quality.

A camera module according to an example embodiment of the disclosure may include: a Printed Circuit Board (PCB), a first image sensor and a second image sensor disposed on the PCB, a lens holder having an upper plate facing and spaced apart from the PCB and a sidewall extending from an edge of the upper plate toward the PCB, wherein the upper plate includes a first through-hole and a second through-hole aligned to the first image sensor and the second image sensor, respectively, a first lens assembly including a first lens system and a first barrel accommodating the first lens system, and assembled to the first through-hole to be aligned with the first image sensor, and a second lens assembly including a second lens system and a second barrel accommodating the second lens system, and assembled to the second through-hole to be aligned with the second image sensor. The first barrel may include a first sidewall to be coupled to the first through-hole and a second sidewall having a greater diameter than the first sidewall and located between the first through-hole and the first image sensor. The second barrel may include a third sidewall to be coupled to the second through-hole and a fourth sidewall having a greater diameter than the third sidewall and located between the second through-hole and the second image sensor.

An electronic device according to an example embodiment of the disclosure may include: a housing, and a camera module disposed inside the housing and configured to receive light through at least part of the housing. The camera module may include a printed circuit board (PCB), a first image sensor and a second image sensor disposed on the PCB, a lens holder having an upper plate facing and spaced apart from the PCB and a sidewall extending from an edge of the upper plate toward the PCB, wherein the upper plate includes a first through-hole and a second through-hole aligned to the first image sensor and the second image sensor respectively, a first lens assembly including a first lens system and a first barrel accommodating the first lens system, and assembled to the first through-hole to be aligned with the first image sensor, and a second lens assembly including a second lens system and a second barrel accommodating the second lens system, and assembled to the second through-hole to be aligned with the second image sensor. The first barrel may include a first sidewall to be coupled to the first through-hole and a second sidewall having a greater diameter than the first sidewall and located between the first through-hole and the first image sensor. The second barrel may include a third sidewall to be coupled to the second through-hole and a fourth sidewall having a greater diameter than the third sidewall and located between the second through-hole and the second image sensor.

A method of manufacturing a camera module according to an example embodiment of the disclosure may include: providing a lens holder including an upper plate including a first through-hole and a second through-hole and a sidewall extending from an edge of the upper plate in a direction substantially vertical to the upper plate, locating a first lens assembly and a second lens assembly in a space surrounded by the upper plate and the sidewall, coupling the first lens assembly and the second lens assembly to the first through-hole and second through-hole of the upper plate respectively, coupling a bottom face of the sidewall on the PCB so that the first lens assembly and the second lens assembly are aligned with a first image sensor and second image sensor mounted on the PCB respectively, and adjusting a distance between the lens assemblies and the image sensors mounted on the PCB.

According to various example embodiments of the disclosure, a length of a base line can be minimized and/or reduced in a plurality of camera modules (e.g., a dual camera), which facilitates the plurality of camera modules (e.g., the dual camera) to obtain an image of good quality. In addition, when the plurality of camera modules (e.g., the dual camera) are located below the display, a size of a portion corresponding to a Field Of View (FOV) of the plurality of camera modules (e.g., the dual camera) can be minimized and/or reduced. Therefore, a size of a portion having a low pixel density in the display can be minimized and/or reduced so as to have high transmittance.

Advantageous effects that can be obtained in the disclosure are not limited to the aforementioned advantageous effects, and other unmentioned advantageous effects can be clearly understood by one of ordinary skill in the art to which the disclosure pertains from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
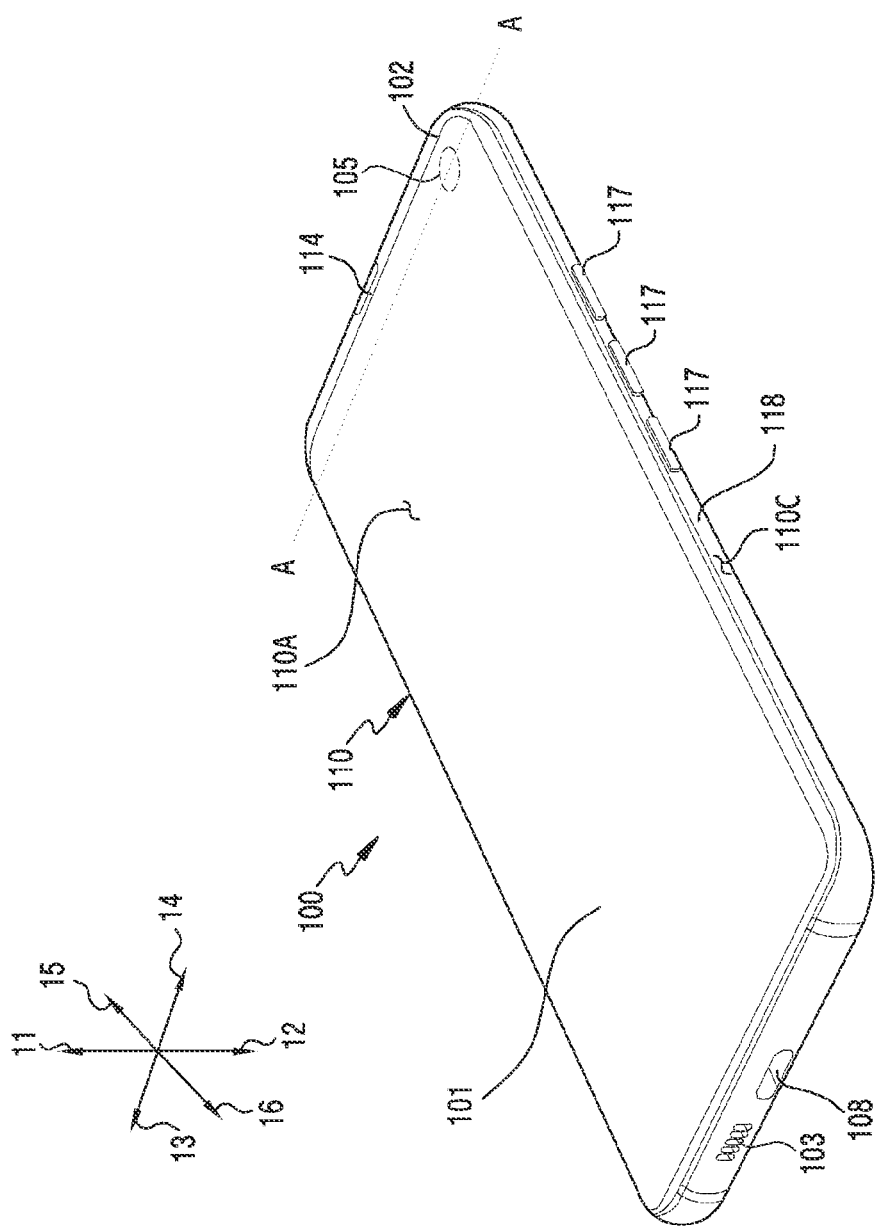
FIG. 1 is a front perspective view illustrating an electronic device according to various embodiments.
Figure 2:
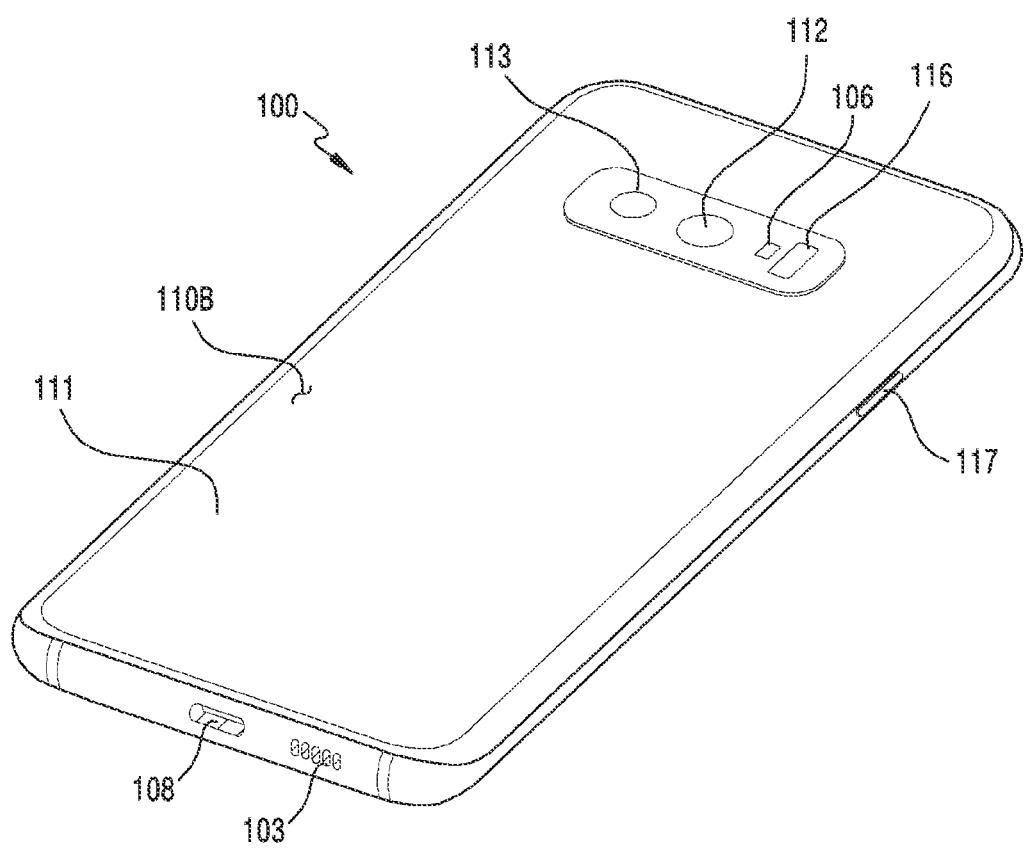
FIG. 2 is a rear perspective view illustrating the electronic device of FIG. according to various embodiments.
Figure 3:
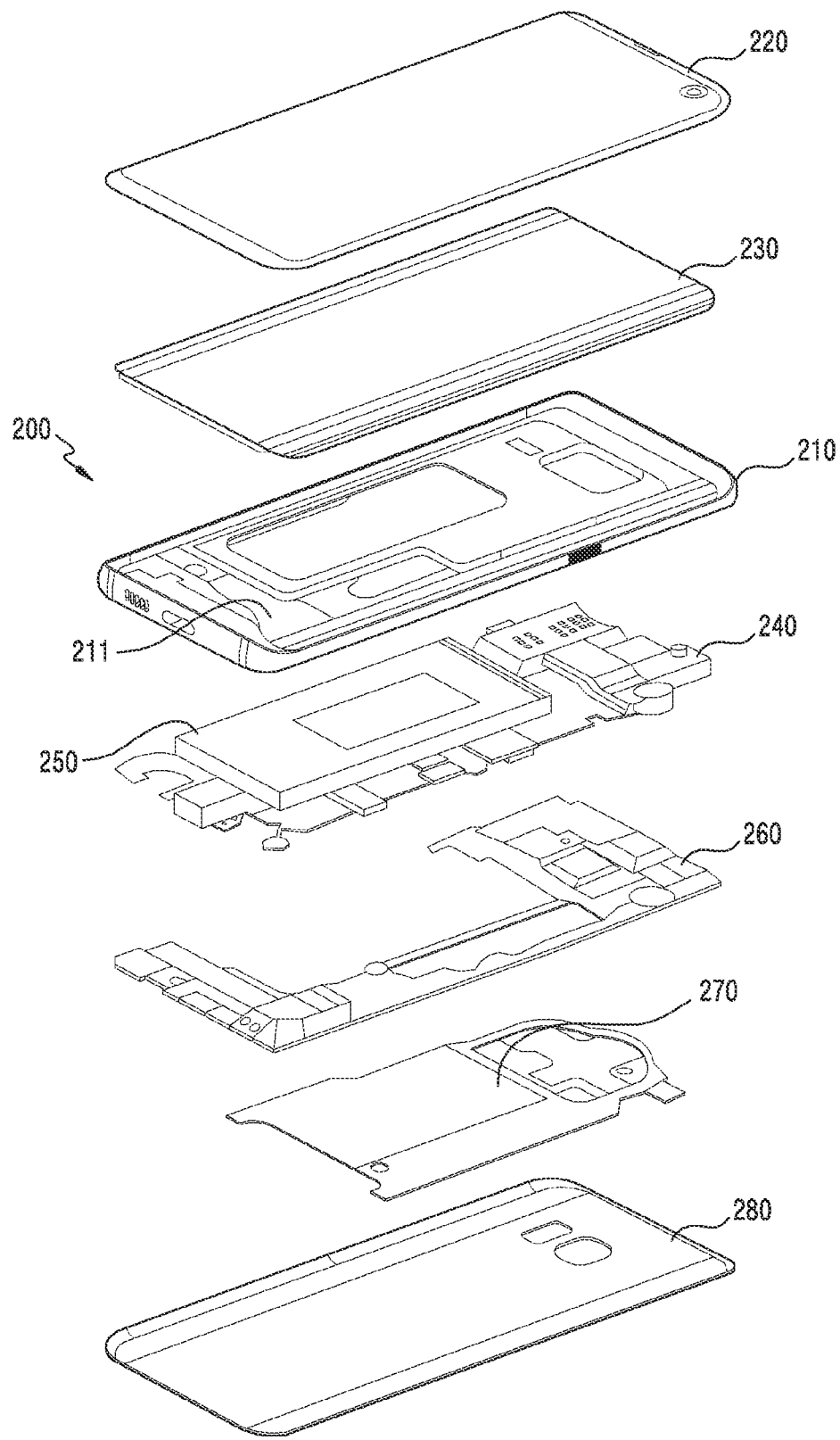
FIG. 3 is an exploded perspective view of the electronic device of FIG. 1 according to various embodiments.

FIG. 1 is a front perspective view illustrating an electronic device 100 according to various embodiments. FIG. 2 is a rear perspective view illustrating the electronic device 100 of FIG. 1 according to various embodiments. FIG. 3 is an exploded perspective view of the electronic device 100 of FIG. 1 according to various embodiments.

Referring to FIG. 1 and FIG. 2, the electronic device 100 according to an embodiment may include a housing 110 including a first face (or a front face) 110A, a second face (or a rear face) 110B, and a side face 110C (or a sidewall) surrounding a space between the first face 110A and the second face 110B. In an embodiment (not shown), the housing may refer to a structure which is part of the first face 110A, second face 110B, and side face 110C of FIG. 1.

According to an embodiment, the first face 110A may be constructed of a front plate 102 (e.g., a polymer plate or a glass plate having various coating layers) which is at least partially transparent in practice. According to an embodiment, the front plate 102 may include a curved portion seamlessly extending by being bent from the first face 110A toward a rear plate 111 in at least one side edge portion.

According to various embodiments, the second face 110B may be constructed of the rear plate 111 which is opaque in practice. For example, the rear plate 111 may be constructed of coated or colored glass, ceramic, polymer, metallic materials (e.g. aluminum, stainless steel (STS), or magnesium) or a combination of at least two of the these materials. According to an embodiment, the rear plate 111 may include a curved portion seamlessly extending by being bent from the second face 110B toward the front plate 102 in at least one side edge portion.

According to various embodiments, the side face 110C may be constructed of a side bezel structure (or a side member or a sidewall) 118 joined to the front plate 102 and the rear plate 111 and including metal and/or polymer. In various embodiments, the rear plate 111 and the side bezel structure 118 may be constructed integrally and may include the same material (e.g., a metallic material such as aluminum).

According to an embodiment, the electronic device 100 may include at least one of a display 101, audio modules 103 and 114, a sensor module, a camera module 105, a key input device 117, and a connector hole 108. In various embodiments, the electronic device 100 may omit at least one of components (e.g., the key input device 117), or other components may be additionally included. For example, the electronic device 100 may include a sensor module (not shown). For example, a sensor such as a proximity sensor or an illumination sensor may be integrated to the display 101 in a region provided by the front plate 102, or may be disposed at a location adjacent to the display 101. In various embodiments, the electronic device 100 may further include a light emitting element, and the light emitting element may be disposed at a location adjacent to the display 101 in the region provided by the front plate 102. The light emitting element may provide, for example, state information of the electronic device 100 in an optical form. In an embodiment, the light emitting element may provide, for example, a light source interworking with an operation of the camera module 105. The light emitting element may include, for example, an LED, an IR LED, and a xenon lamp.

The display 101 may be exposed through, for example, some portions of the front plate 102. In various embodiments, an edge of the display 101 may be constructed to be substantially the same as a shape of a periphery (e.g., a curved face) adjacent to the front plate 102. In an embodiment (not shown), in order to expand an area in which the display 101 is exposed, the display 110 and the front plate 102 may be constructed to have substantially the same interval between peripheries thereof. In an embodiment (not shown), a portion of a screen display region of the display 101 may have a recess or opening, and may include other electronic components, for example, the camera module 105 and a proximity sensor or illumination sensor (not shown), which are aligned with the recess or the opening.

In an embodiment, at least one of camera modules 112 and 113, a finger print sensor 116, and a flash 106 may be included in a rear face of the screen display region of the display 101. In an embodiment (not shown), the display 101 may be disposed adjacent to or joined with a touch sensing circuit, a pressure sensor capable of measuring touch strength (pressure), and/or a digitizer for detecting a magnetic-type stylus pen.

In an embodiment, the electronic device 100 may include the display 101 which provides a screen (e.g., a display screen) by being disposed such that a sliding motion is possible. For example, a display region of the electronic device is a region visually exposed to output an image, and the electronic device may adjust the display region according to a movement of a sliding plate (not shown) or a movement of the display 101. For example, since at least part (e.g., the housing 110) of the electronic device 100 operates such that sliding is possible at least partially, a rollable-type electronic device configured to facilitate selective expansion of the display region may be included. For example, the display 101 may also be referred to as a slide-out display or an expandable display. According to an embodiment, the display 101 may include a plurality of regions (e.g., a portion 301 corresponding to a Field Of View (FOV) of FIG. 4) overlapping the camera modules 105, 112, and 113, when viewed from a front face (e.g., a face on which the display 101 is mainly disposed). For example, the portion 301 corresponding to the FOV may be moved according to the movement of the display 101, and the electronic device 100 may include the portion 301 corresponding to another FOV, corresponding to a location of the moved display 101. The audio modules 103 and 114 may include a microphone hole and a speaker hole. The microphone hole may have a microphone disposed inside thereof to acquire external sound. In various embodiments, a plurality of microphones may be disposed inside the microphone hole to sense a sound direction. In various embodiments, the speaker hole and the microphone hole may be implemented with one hole 103. In various embodiments, the speaker (e.g., a piezo speaker) may be included without the speaker hole. In various embodiments, the speaker hole may include an external speaker hole and the communication receiver hole 114.

The electronic device 100 includes a sensor module (not shown) to generate an electrical signal or data value corresponding to an internal operational state or an external environmental state. The sensor module may further include a proximity sensor disposed adjacent to the first face 110A of the housing 110, a fingerprint sensor disposed integrally or adjacent to the display 101, and or a biometric sensor (e.g., a Heart Rate Monitoring (HRM) sensor) disposed to the second face 110B of the housing 110. The electronic device 100 may further include at least one of senor modules (not shown), for example, a gesture sensor, a gyro sensor, an atmospheric pressure sensor, a magnetic sensor, an acceleration sensor, a grip sensor, a color sensor, an InfraRed (IR) sensor, a biometric sensor, a temperature sensor, a humidity sensor, and an illuminance sensor.

In an embodiment, the electronic device 100 may correspond to a camera module 1301 of FIG. 13 described below. In an embodiment, the electronic device 100 may include the same or similar components as those included in the electronic device 1301.

The camera modules 105, 112, and 113 may include the first camera module 105 disposed to the first face 110A of the electronic device 100, the second camera modules 112 and 113 disposed to the second face 110B, and/or the flash 106. The camera modules 105, 112, and 113 may include one or more lenses, an image sensor, and/or an image signal processor. The flash 106 may include, for example, a Light Emitting Diode (LED) or a xenon lamp. In various embodiments, at least two or more lenses (wide-angle and telephoto lenses) and image sensors may be disposed to one face of the electronic device 100. According to an embodiment, the electronic device 100 may include the plurality of camera modules 105, 112, and 113 each having a different attribute or function. For example, the plurality of camera modules 105, 112, and 113 including lenses having different FOVs (e.g., lens assemblies 440 and 450 of FIG. 5) may be configured, and based on a user's selection, the electronic device 100 may select (or change) the camera modules 105, 112, and 113 of FOVs related to the user selection. For example, at least one of the plurality of camera modules 105, 112, and 113 may be a wide-angle camera, and at least another one may be a telephoto camera. Similarly, at least one of the plurality of camera modules 105, 112, and 113 may be a front camera, and at least another one may be a rear camera.

According to an embodiment, the plurality of camera modules 105, 112, and 113 may include at least one of a wide-angle camera, a telephoto camera, a color camera, a monochrome camera, and an InfraRed (IR) camera (e.g., a Time Of Flight (TOF) camera, a structured light camera). According to an embodiment, the IR camera may operate as at least part of a sensor module. For example, the TOF camera may operate as at least part of a sensor module for detecting a distance to a subject.

According to an embodiment, at least one of the camera modules 105, 112, and 113 may be disposed in a lower-end direction (e.g., a direction 12) of the display 101. For example, since the first camera module 105 is disposed to the portion 301 corresponding to the FOV of the display 101, a location of the first camera module 105 may not be visually identified (or exposed). According to an embodiment, when the display 101 is viewed from a front face (e.g., a direction 11), the first camera module 105 may be disposed to the portion 301 corresponding to the FOV which is at least part of the display 101, thereby obtaining an image of an external subject without having to be visually exposed to the outside. For example, when the display 101 is viewed from the front face (e.g., the direction 11), the first camera module 105 may be an Under Display Camera (UDC) disposed to overlap at least part of the portion 301 corresponding to the FOV so that the image of the external subject is obtained without having to be visually exposed. Although it is illustrated for example in FIG. 1 and FIG. 2 that the first camera module 105 is disposed to face a front face (e.g., a face on which the display 101 is mainly disposed) of the electronic device 100, the disclosure is not limited thereto. For example, when the display 101 extends to a rear face (e.g., a face facing the direction 12) of the electronic device 100, at least one of the camera modules 112 and 113 may be disposed to a lower end of a display (not shown) facing the rear face, thereby obtaining the image of the external subject without having to be visually exposed.

In an embodiment, each of the camera modules 105, 112, and 113 may correspond to a camera module 1380 of FIG. 13 described below. In an embodiment, the camera modules 105, 112, and 113 may include the same or similar components as those of the camera module 1380.

The key input device 117 may be disposed to the side face 110C of the housing 110. In an embodiment, the electronic device 100 may not include the entirety or part of the aforementioned key input device 117. The key input device 117, which is not included, may be implemented on the display 101 in a different form such as a soft key or the like. In various embodiments, the key input device may include at least part of the fingerprint sensor 116 disposed to the second face 110B of the housing 110.

The connector hole 108 may accommodate a connector for transmitting/receiving power and/or data of an external electronic device and/or a connector for transmitting/receiving an audio signal with respect to the external electronic device. For example, the connector hole 108 may include a USB connector or an earphone jack.

Referring to FIG. 3, an electronic device 200 (e.g., the electronic device of FIG. 1) may include a side bezel structure 210 (e.g., the side bezel structure 118 of FIG. 1), a first support member 211 (e.g., a bracket), a front plate (e.g., the front plate 102 of FIG. 1), a display 230 (e.g., the display 101 of FIG. 1), a Printed Circuit Board (PCB) 240 (e.g., a PCB, a Flexible PCB (FPCB), or a Rigid-Flexible PCB (RFPCB)), a battery 250, a second support member 260 (e.g., a rear case), an antenna 270, and a rear plate 280 (e.g., the rear plate 111 of FIG. 1). In various embodiments, the electronic device 200 may omit at least one (e.g., the first support member 211 or the second support member 260) of these components, or may additionally include other components. At least one of the components of the electronic device 200 may be the same as or similar to at least one of the components of the electronic device 100 of FIG. 1 or FIG. 2, and redundant descriptions will be omitted hereinafter.

The first support member 211 may be coupled with the side bezel structure 210 by being disposed inside the electronic device 200, or may be constructed integrally with respect to the side bezel structure 210. The first support member 211 may be constructed of, for example, a metal material and/or non-metal material (e.g., polymer). The display 230 may be joined to one face of the first support member 211, and the PCB 240 may be joined to the other face thereof. A processor, a memory, and/or an interface may be mounted on the PCB 240. The processor may include, for example, one or more of a central processing unit, an application processor, a graphic processing unit, an image signal processor, a sensor hub processor, and a communication processor.

The memory may include, for example, a volatile memory or a non-volatile memory.

The interface may include, for example, a High Definition Multimedia Interface (HDMI), a Universal Serial Bus (USB) interface, a Secure Digital (SD) card interface, and/or an audio interface. For example, the interface may electrically or physically couple the electronic device 200 and the external electronic device, and may include a USB connector, an SD card/MMC connector, or an audio connector.

As a device for supplying power to at least one component of the electronic device 200, the battery 250 may include, for example, a non-rechargeable primary cell, a rechargeable secondary cell, or a fuel cell. At least part of the battery 250 may be disposed on the same plane substantially with respect to, for example, the PCB 240. The battery 250 may be disposed integrally inside the electronic device 200, or may be detachably disposed with respect to the electronic device 200.

The antenna 270 may be disposed between the rear plate 280 and the battery 250. The antenna 270 may include, for example, a Near Field Communication (NFC) antenna, a wireless charging antenna, and/or a Magnetic Secure Transmission (MST) antenna. The antenna 270 may perform short-range communication, for example, with the external electronic device, or may wirelessly transmit/receive power required for charging. In an embodiment, an antenna structure may be constructed by at least part of the side bezel structure and/or the first support member 211 or a combination thereof.

In an embodiment, the electronic device 200 may correspond to the electronic device 1301 of FIG. 13 described below. In an embodiment, the electronic device 200 may include the same or similar components as those included in the electronic device 1301.

Figure 4:
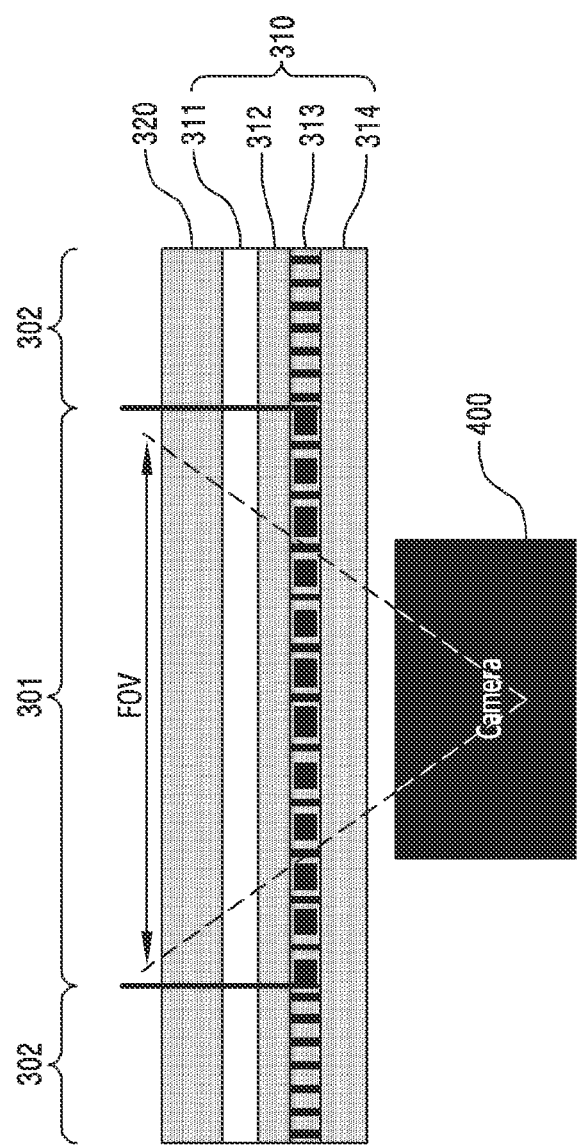
FIG. 4 is a diagram illustrating a camera module located below a display according to various embodiments.

FIG. 4 is a diagram illustrating a camera module 400 located below a display 310 according to various embodiments. FIG. 4 may correspond to, for example, a cross-section of the electronic device of FIG. 1, taken along the line A-A. The display 310 of FIG. 4 may correspond to the display 101 of FIG. 1 or the display 230 of FIG. 2.

In an embodiment, the display 310 may include a plurality of layers. For example, the display 310 may include at least one of a base layer 314, a display panel 313, and a polarizing plate 312. In an embodiment, the display 310 may be attached to a window 320. For example, the display 310 may be attached to the window 320 through an Optically Clear Adhesive (OCA) 311. According to an embodiment, the display panel 313 may include Organic Light Emitting Diodes (OLEDs). According to an embodiment, the base layer 314 may include a transparent insulating substrate. For example, the base layer 314 may be constructed of a glass substrate, a quartz substrate, or a transparent resin substrate. For example, the transparent resin substrate may include a polyimide-based resin, an acryl-based resin, a polyacrylate-based resin, a polycarbonate-based resin, a polyether-based resin, a sulfonic acid-based resin, and/or a polyethyleneterephthalate-based resin. In the disclosure, the display 310 may be understood as a concept including the window 320.

According to an embodiment, the display 310 is not limited to the illustrated structure and may be constructed variously. For example, the display may not include the polarizing plate 312 (e.g., a retarder), and may include a color filter layer (not shown) in a Color filter On Encapsulation (COE) manner. In addition, other subsidiary material layers (not shown) may be included at a lower end of the display 310 (e.g., in a direction toward the camera module 400). For example, the other subsidiary material layer (not shown) may include a light blocking layer (e.g., a black layer including an uneven pattern), a buffer layer (e.g., a cushion), a heat dissipation sheet (e.g., a (graphite) sheet), or a conductive metal sheet (e.g., a metal plate).

In an embodiment, the camera module 400 may be disposed below the display 310. For example, the camera module 400 may correspond to the camera module 105 of FIG. 1. In order for the camera to collect external light, a pixel density of the portion 301 corresponding to a Field Of View (FOV) of the camera may be lower than a pixel density of the remaining portion 302 in the display 310 to acquire a sufficient amount of light.

The camera module 400 of the disclosure is not limited to being disposed below the display 310. For example, the display 310 may include a notch or punch hole corresponding to the camera module 400, and the camera module 400 may be aligned with the notch or punch hole of the display 310. As another example, the camera module 400 may be disposed below an opaque cover, and may collect external light through an opening constructed at a cover.

Figure 5:
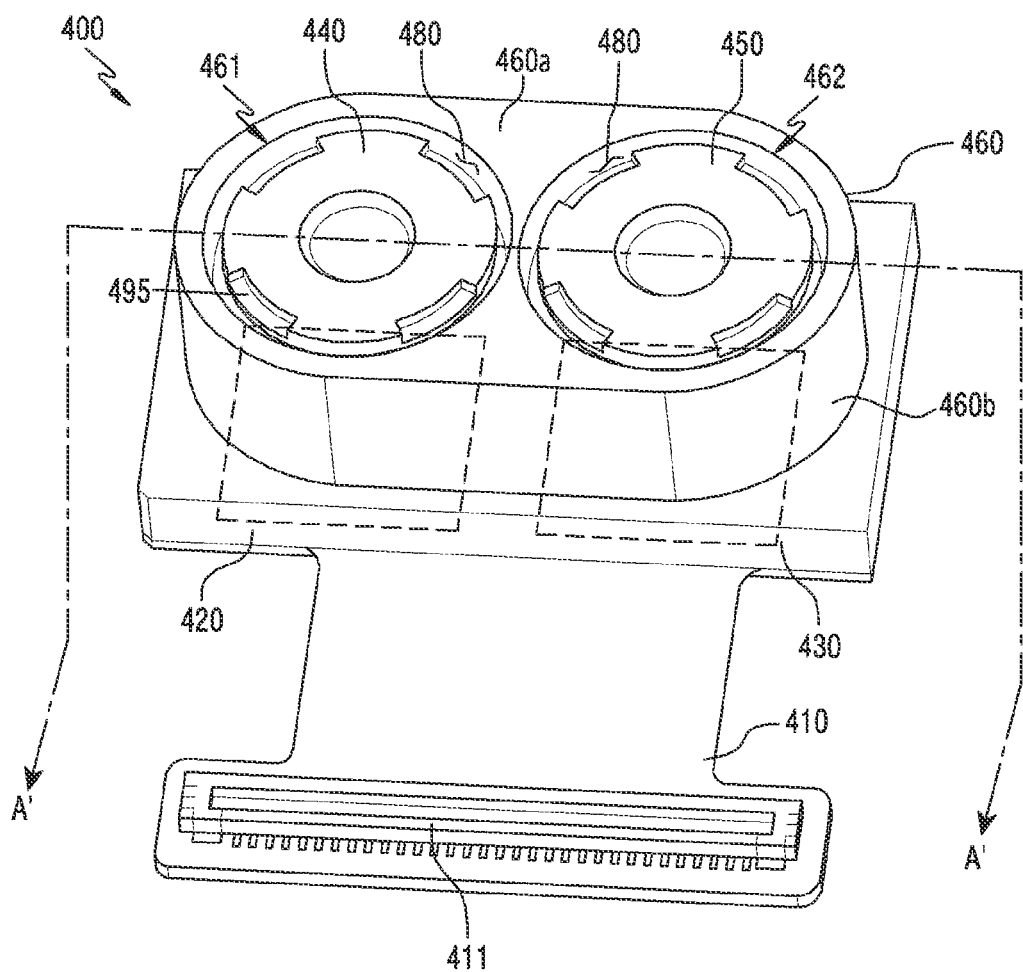
FIG. 5 is a perspective view of a camera module according to various embodiments.

FIG. 5 is a perspective view of a camera module 400 according to various embodiments. For example, the camera module 400 of FIG. 5 may be included as one component of the electronic device 100 of FIG. 1. Referring to FIG. 5, in an embodiment, the camera module 400 may include a PCB 410, image sensors 420 and 430, lens assemblies 440 and 450, and a lens holder 460.

In an embodiment, the camera module 400 may include at least one electronic component disposed on the PCB 410. In an embodiment, at least one of the image sensors 420 and 430 may be disposed on the PCB 410. In an embodiment, the camera module 400 may include the first image sensor 420 and the second image sensor 430 spaced apart from the first image sensor 420 on the PCB 410. In an embodiment, the first image sensor 420 and the second image sensor 430 may be homogeneous or heterogeneous image sensors. For example, the first image sensor 420 and the second image sensor 430 may be respectively a Red-Green-Blue (RGB) sensor and a mono sensor. As another example, both of the first image sensor 420 and the second image sensor 430 may be the RGB sensors.

In an embodiment, the PCB 410 may include a connector 411 electrically coupled to the image sensors 420 and 430. The PCB 410 may include a conductive path (e.g., a conductive pattern or trace) which electrically couples the image sensors 420 and 430 to the connector 411. The image sensors 420 and may receive power through the connector 411 or may communicate with another electronic component (e.g., an image processing processor).

In an embodiment, the camera module 400 may include at least one of the lens assemblies 440 and 450. In an embodiment, the electronic device may include the first lens assembly 440 corresponding to the first image sensor 420 and the second lens assembly 450 corresponding to the second image sensor 430. In an embodiment, the first lens assembly 440 and the second lens assembly 450 may have substantially the same Modulation Transfer Function (MTF) characteristic. According to an embodiment, the first lens assembly 440 and the second lens assembly 450 may have different MTF characteristics. For example, the first lens assembly 440 may be a wide-angle lens, and the second lens assembly 450 may be a telephoto lens.

In an embodiment, the lens assemblies 440 and 450 may include a lens system constructed of at least one lens, and a barrel for accommodating the lens system. In an embodiment, the lens assemblies 440 and 450 may be assembled to the PCB 410 through the lens holder 460. In an embodiment, the lens assemblies 440 and 450 may be fastened to the lens holder 460 through screw coupling.

In an embodiment, when the lens assemblies 440 and 450 are assembled to the PCB 410, at least one lens included in the lens assemblies 440 and 450 may be aligned with the image sensors 420 and 430. In an embodiment, the first lens assembly 440 and the second lens assembly 450 may be located to be at least partially aligned respectively with the first image sensor 420 and the second image sensor 430.

In an embodiment, the lens holder 460 may include at least one of openings 461 and 462. For example, the lens holder 460 may include a through-hole. In an embodiment, the lens holder 460 may include an upper plate 460a facing and spaced apart from the PCB 410. The upper plate 460a may include a through-hole corresponding to the lens assemblies 440 and 450. The through-hole provides the openings 461 and 462 to the lens holder 460. In an embodiment, the lens holder 460 may include the first opening 461 corresponding to the first lens assembly 440 and the second opening 462 corresponding to the second lens assembly 450.

In an embodiment, the lens assemblies 440 and 450 may be disposed in a space defined by the lens holder 460. In an embodiment, the lens holder 460 may include a sidewall 460b extending from an edge of the upper plate 460a toward the PCB 410. At least part of the lens assemblies 440 and 450 may be located in a space defined by the upper plate 460a, the sidewall 460b, and the PCB 410. The lens assemblies 440 and 450 may be exposed at least in part to the outside of the lens holder 460 through the openings 461 and 462. The first lens assembly may collect light through the first opening 461, and the second lens assembly may collect light through the second opening 462.

In an embodiment, the lens assemblies 440 and 450 may include at least one jig accommodating portion 495. The jig accommodating portion 495 may be used to adjust a distance between the lens assemblies 440 and 450 and the image sensors 420 and 430. For example, the lens assemblies 440 and 450 may be screw-coupled to the lens holder 460, and may rotate the lens assemblies 440 and 450 about the lens holder 460 through a tool (e.g., a jig) coupled to the jig accommodating portion 495. When the lens assemblies 440 and 450 rotate, the lens assemblies 440 and 450 may move in a direction of an optical axis (e.g., optical axes 446 and 456 of FIG. 6) of a lens with respect to the lens holder 460, thereby adjusting the distance between the lens assemblies 440 and 450 and the image sensors 420 and 430.

In an embodiment, when the lens assemblies 440 and 450 are assembled to the lens holder 460, an air gap 480 may be present between the lens assemblies 440 and 450 and the lens holder 460. Since an adhesive is applied to at least part of the air gap 480, the lens assemblies 440 and 450 may be fixed to the lens holder 460.

Figure 6:
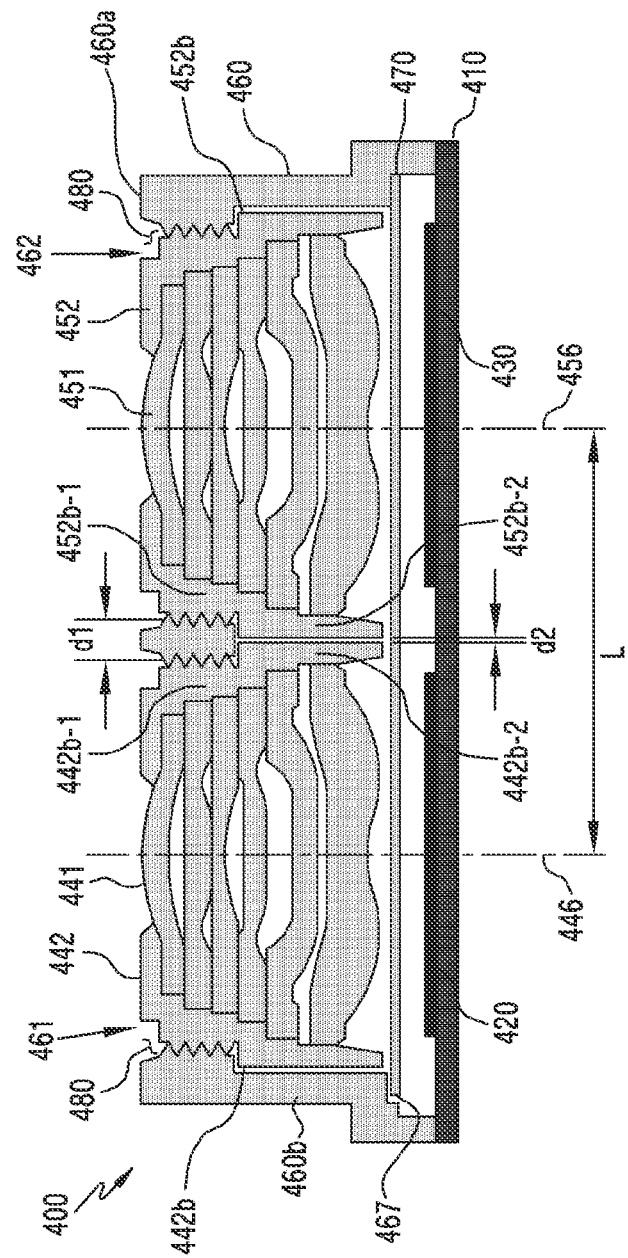
FIG. 6 is a cross-sectional view of a camera module according to various embodiments.
Figure 7:
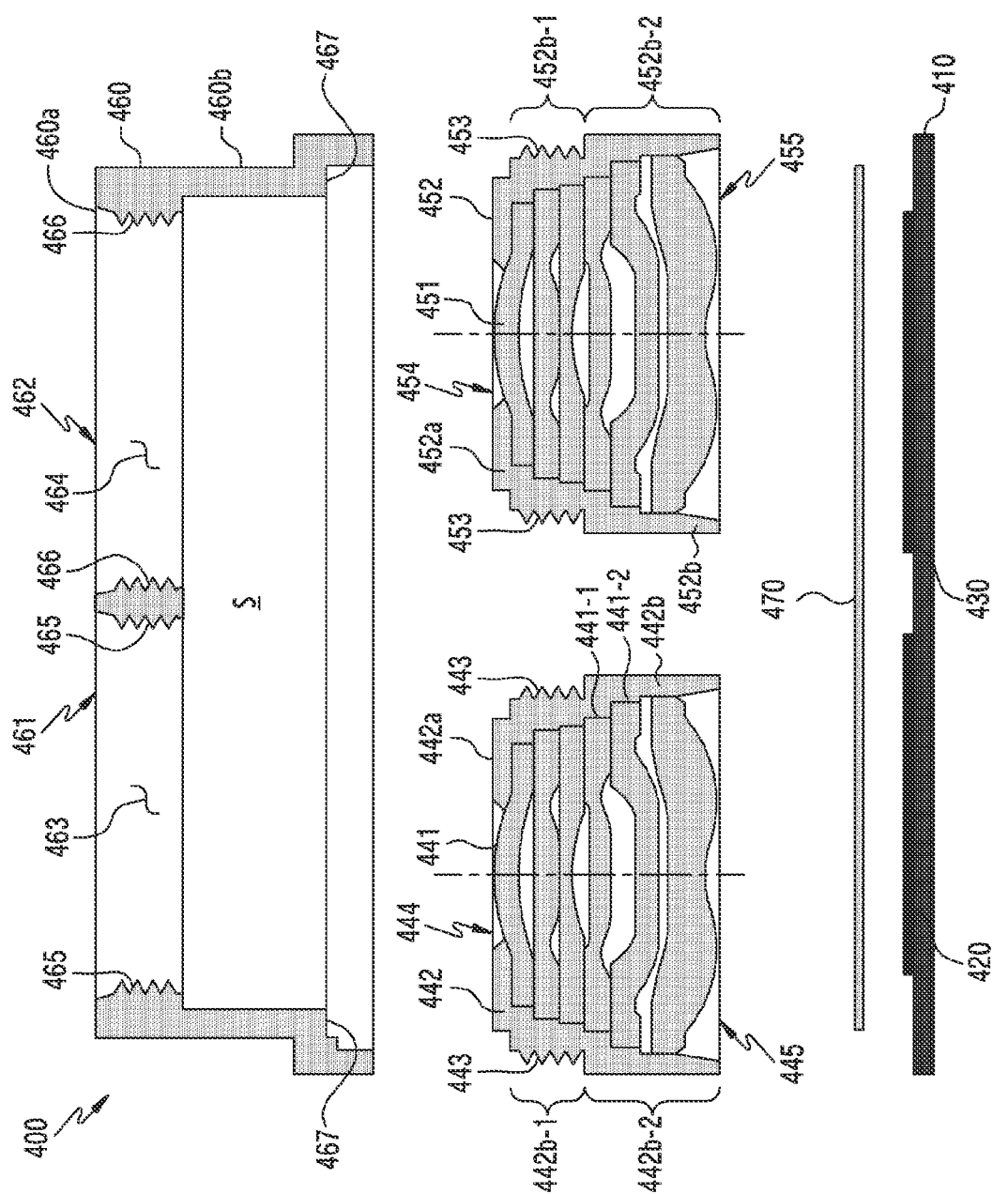
FIG. 7 is an exploded cross sectional view of the camera module of FIG. according to various embodiments.

FIG. 6 is a cross-sectional view of a camera module 400 according to various embodiments. For example, FIG. 6 may be a cross-sectional view of the camera module 400 of FIG. 5, taken along the line A'-A'. FIG. 7 is an exploded view of the cross-sectional view of FIG. 6 according to various embodiments.

In an embodiment, the camera module 400 may include a PCB 410, a first image sensor 420 disposed (e.g., mounted) on the PCB 410, and a second image sensor 430. For example, the image sensors 420 and 430 may be mounted on a conductive pad (or terminal) disposed on a surface of the PCB 410 through soldering. As another example, the image sensors 420 and 430 may be coupled to the conductive pad disposed on the surface of the PCB 410 through wire bonding.

In an embodiment, a lens holder 460 may include an upper plate 460a facing and spaced apart from the PCB 410, and a sidewall 460b extending from an edge of the upper plate 460a toward the PCB 410. In an embodiment, a lens assembly (e.g., the lens assemblies 440 and 450 of FIG. 5) may be disposed in a space S defined by the PCB 410, the sidewall 460b, and the upper plate 460a. In an embodiment, at least part of the lens assemblies 440 and 450 may be exposed at least in part to the outside of the lens holder 460 through openings 461 and 462 of the upper plate 460a.

In an embodiment, the lens holder 460 may include at least one of the openings 461 and 462 in the upper plate 460a. In an embodiment, the lens holder may include at least one of through-holes 463 and 464 in the upper plate 460a, and at least one through-hole may provide at least one of the openings 461 and 462 to the lens holder 460. In an embodiment, the upper plate 460a may include the first through-hole 463 having the first opening 461 and the second through-hole 464 having the second opening 462.

In an embodiment, lens assemblies 440 and 450 may be coupled to the lens holder 460. In an embodiment, the lens assemblies 440 and 450 may be assembled to the through-holes 463 and 464 constructed on the upper plate 460a of the lens holder 460. In an embodiment, the lens first lens assembly 440 and the second lens assembly 450 may be coupled respectively to the first through-hole and the second through-hole 464.

In an embodiment, the lens assemblies 440 and 450 may be assembled to the lens holder 460 through screw-coupling. In an embodiment, the through-hole may include female threads 465 and 466 on at least part of an inner circumferential face, and the lens assemblies 440 and 450 may include male threads 443 and 453 corresponding to the female threads 465 and 466 of the through-hole on at least part of an outer circumferential face. In an embodiment, the first through-hole 463 and the second through-hole 464 may respectively include the first female thread 465 and the second female thread 466 on at least part of the inner circumferential face. The first lens assembly 440 may include the first male thread 443 corresponding to the first female thread 465 on at least part of the outer circumferential face, and the second lens assembly 450 may include the second male thread 453 corresponding to the second female thread on at least part of the outer circumferential face. According to an embodiment, a shape of the male threaded threads 443 and 453 is not limited to a bar as illustrated, and may be constructed variously. For example, the male threads 443 and 453 may be shaped to be asymmetrical to the left and right with respect to the lens axis. A right side (e.g., a portion adjacent to a second lens system 451) of the first male thread 443 may be constructed to have a length (e.g., a length of a male thread) shorter than a left side (e.g., a portion adjacent to the sidewall 460a of the lens holder 460) of the first male thread 443, and thus may have a longer distance to the first image sensor 420. According to an embodiment, a gap d2 between the first lens assembly 440 and the second lens assembly 450 (e.g., a gap between lower sidewalls 442b-2 and 452b-2 of the lens assemblies 440 and 450) may be decreased with a change in the length of the male thread 443. In an embodiment, the lens assemblies 440 and 450 may include lens systems 441 and 451 constructed of at least one lens, and barrels 442 and 452 which accommodate the lens systems 441 and 451.

In an embodiment, the barrels 442 and 452 may include upper plates 442a and 452a and sidewalls 442b and 452b extending from edges of the upper plates 442a and 452a. In an embodiment, the upper plates 442a and 452a of the barrels 442 and 452 may include openings 444 and 454 aligned with the lens axis. Light may be incident to the lens systems 441 and 451 through the openings 444 and of the upper plates 442a and 452a. Light passing through the lens systems 440 and 451 may be incident to the image sensors 420 and 430 through the openings 445 and 455 defined by a bottom face of the sidewalls 442b and 452b.

In an embodiment, the lens systems 441 and 451 may be located in a space defined by the upper plates 442a and 452a and the sidewalls 442b and 452b. In an embodiment, the barrels 442 and 452 may include at least one stepped portion constructed along an inner circumferential face. In an embodiment, at least one lens may be attached to the stepped portion.

In an embodiment, a plurality of lenses of the lens systems 441 and 451 may have larger outer diameters as they are disposed closer to the image sensors 420 and 430. For example, the first lens system 441 may include a first lens 441-1 and a second lens 441-2, and the second lens 441-2 may be located closer to the image sensors 420 and 430 than the first lens 441-1. The second lens 441-2 may have a greater outer diameter than the first lens 441-1.

In an embodiment, similarly to the lens system, the outer circumferential face of the barrel may also have a greater outer diameter as they are closer to the image sensors 420 and 430. In an embodiment, the first barrel 442 may include a first upper sidewall 442b-1 and a first lower sidewall 442b-2 having a greater diameter than the first upper sidewall 442b-1. When the first lens assembly 440 is disposed on the first image sensor 420, the first lower sidewall 442b-2 may be located closer to the first image sensor 420 than the first upper sidewall 442b-1. In an embodiment, the second barrel 452 may include a second upper sidewall 452b-1 and a second lower sidewall 452b-2 having a greater diameter than the second upper sidewall 452b-1. When the second lens assembly 450 is disposed on the second image sensor 430, the second lower sidewall 452b-2 may be located closer to the second image sensor 430 than the second upper sidewall 452b-1.

In an embodiment, the first lens assembly 440 and the second lens assembly 450 may be assembled to the lens holder 460 respectively through the first upper sidewall 442b-1 and the second upper sidewall 452b-1. In an embodiment, the first male thread 443 and the second male thread 453 may be constructed at least in part on outer circumferential face of the first upper sidewall 442b-1 and the second upper sidewall 452b-1, respectively.

Referring to FIG. 6, in an embodiment, a gap d2 between the lower sidewalls 442b-2 and 452b-2 of the lens assemblies 440 and 450 may be smaller than a gap d1 between the upper sidewalls 442b-1 and 452b-1. In an embodiment, an air gap may exist between the lower sidewalls 442b-2 and 452b-2. In an embodiment, portion of the upper plate 460a of the lens holder 460 may exist between the upper sidewalls 442b-1 and 452b-1.

In an embodiment, since the lens holder 460 is coupled to the upper sidewalls 442b-1 and 452b-1 of the lens assemblies 440 and 450, a length of a base line L may extend to the minimum extent possible due to the lens holder 460. According to an embodiment, the base line L may refer, for example, to a distance between the optical axis 446 of the first lens system 441 and the optical axis 456 of the second lens system 451. When the lower sidewalls 442b-2 and 452b-2 of the lens assemblies 440 and 450 are coupled to the lens holder 460, part of the lens holder 460 may exist between the lower sidewalls 442b-2 and 452b-2 due to the lens holder 460. In this case, the length of the base line may be increased by a length corresponding to part of the lens holder 460 disposed between the lower sidewalls 442b-2 and 452b-2. According to an embodiment, when the upper sidewalls 442b-1 and 452b-1 of the lens assemblies 440 and 450 are assembled to the lens holder 460, the length of the base line may be prevented from being increased due to the lens holder 460 or may be increased to the minimum extent possible. Since the upper sidewalls 442b-1 and 452b-1 of the lens assemblies 440 and 450 have a smaller outer diameter than the lower sidewalls 442b-2 and 452b-2 of the lens assemblies 440 and 450, even if the lenses 440 and 450 are disposed as close as possible, it is possible to secure a space in which the lens holder 460 is disposed between the upper sidewalls 442b-1 and 452b-1 of the lens assemblies 440 and 450.

In an embodiment, the camera module 400 may include an optical filter located between the image sensors 420 and 430 and the lens systems 441 and 451. In an embodiment, the optical filter 470 may be attached to a stepped portion 467 constructed along the inner circumferential face of the lens holder 460. In an embodiment, the optical filter 470 may include a transparent portion and/or an opaque masking portion. In an embodiment, the optical filter 470 may include a first transparent portion corresponding to the first image sensor 420 and a second transparent portion corresponding to the second image sensor 430. A masking portion may be located between at least the first transparent portion and the second transparent portion. The optical filter 470 may adjust a characteristic of light entering the image sensors 420 and 430 through the lens systems 441 and 451. For example, the optical filter 470 may block an ultraviolet ray.

In an embodiment, the camera module 400 of FIGS. 4, 5, 6 and 7 may correspond to the camera module 1380 of FIG. 13 described below. In an embodiment, the camera module 400 may include the same or similar components as those of the camera module 1380.

Figure 8:
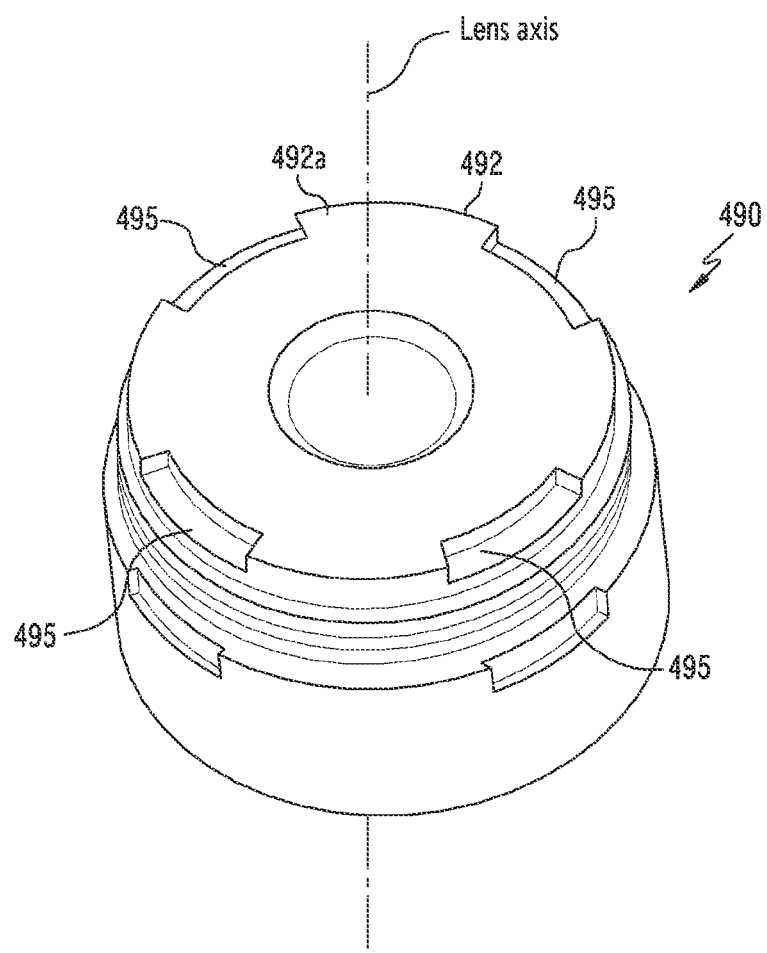
FIG. 8 is a perspective view of a lens assembly according to various embodiments.

FIG. 8 is a perspective view of a lens assembly 490 according to various embodiments. The lens assembly 490 of FIG. 8 may correspond to the first lens assembly 440 or second lens assembly 450 of FIGS. 5, 6 and 7.

A focal distance of a camera of a fixed focus type shall be adjusted in a manufacturing process. When the lens assembly 490 is disposed on image sensors 420 and 430 through a lens holder 460, a focus of a lens may not match a sensor face of the image sensors 420 and 430. A distance between the lens assembly 490 and the image sensors 420 and 430 may be adjusted to match the focus of the lens to the image sensors 420 and 430.

In an embodiment, a barrel 492 may include at least one jig accommodating portion 495. Referring to FIG. 5, in an embodiment, when the barrel 492 is assembled to the lens holder 460, the jig accommodating portion 495 may be exposed at least in part to the outside through openings 461 and 462. For example, the jig accommodating portion 495 of the first lens assembly 440 may be exposed to the outside of the lens holder 460 through the first opening 461. A distance between the lens assembly 490 and the image sensors 420 and may be adjusted by inserting the jig into the jig accommodating portion 495 and rotating the jig together with the lens assembly 490 about a lens axis. The lens assembly 490 is fastened to the lens holder 460 through screw coupling, and when the lens assembly 490 is rotated with respect to the lens holder 460, the lens assembly 490 may move in a direction substantially parallel to the lens axis with respect to the lens holder 460. Since the lens holder 460 and the image sensors 420 and 430 are fixed to a PCB 410, a distance (e.g., a focal distance) between the image sensors 420 and 430 and the lens assembly 490 may be adjusted according to a movement of the lens assembly 490 with respect to the lens holder 460.

In an embodiment, the jig accommodating portion 495 may be disposed along an outer periphery of an upper plate 492a of the barrel 492. According to the illustrated embodiment, the barrel 492 may include the four jig accommodating portions 495 equi-distantly disposed along the barrel 492 of the upper plate 492a. However, an embodiment of the disclosure is not limited thereto, and the number of jig accommodating portions 492 and an arrangement shape thereof may be implemented variously in an embodiment. For example, the shape of the jig accommodating portion 495 may be different depending on a size of the lens assembly 490 and/or a shape of a male thread (e.g., the male threads 443 and 453 of FIG. 7). For example, the shape of the male threads 443 and 453 may be asymmetrical to the left and right with respect to a lens axis, and the jig accommodating portion 495 may be constructed in an asymmetric shape in response thereto.

In an embodiment, after a distance between the image sensors 420 and 430 and the lens assembly 490 is adjusted, an adhesive may be applied between the lens assembly 490 and the lens holder 460 so that the lens assembly 490 does not move with respect to the lens holder 460. Referring to FIG. 5 or FIG. 6, the adhesive may be applied to a gap 480 between the lens assemblies 490 and through-holes of the lens holder 460. The adhesive may include an ultraviolet curable resin. After the adhesive is applied between the lens assembly 490 and the lens holder 460, an ultraviolet ray may be irradiated to the adhesive. When exposed to the ultraviolet ray, the adhesive may be instantaneously cured to fix the lens assembly 490 to the lens holder 460.

Figure 9:
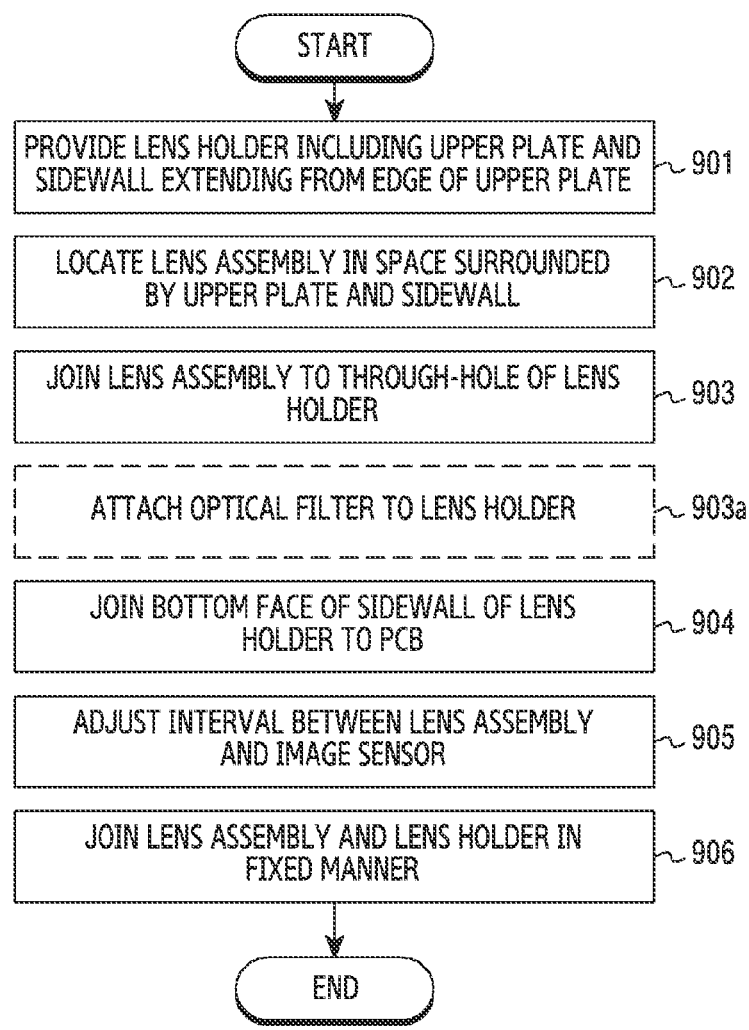
FIG. 9 is a flowchart illustrating an example method of manufacturing a camera module according to various embodiments.
Figure 10:
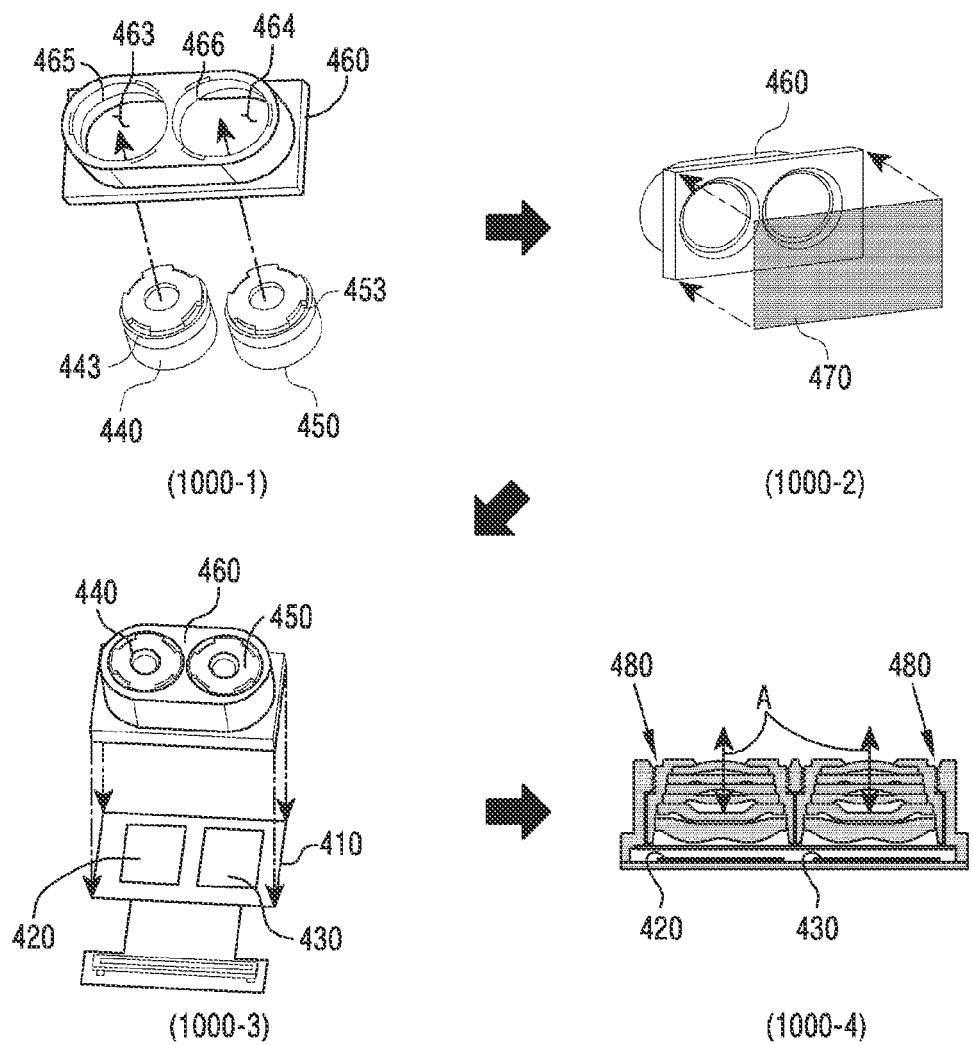
FIG. 10 is a diagram illustrating an example method of manufacturing a camera module according to various embodiments.

FIG. 9 is a flowchart illustrating an example method of manufacturing a camera module according to various embodiments. FIG. 10 is a diagram illustrating an example method of manufacturing a camera module according to various embodiments.

In operation 901, a lens holder (e.g., the lens holder 460 of FIG. 5) may be provided. The lens holder may include an upper plate and a sidewall extending from an edge of the upper plate in a substantially vertical direction. The upper plate may include at least two through-holes. The upper plate and the sidewall may define an inner space (e.g., the space S1 of FIG. 7) of the lens holder.

According to an embodiment, in operation 902, a lens assembly (e.g., the first lens assembly 440 and second lens assembly 450 of FIG. 5) may be located in an inner space of the lens holder. The lens assembly may include a lens system and a barrel for housing the lens system. The lens assembly is located inside the lens holder, and an optical axis of the lens (e.g., optical axes 446 and 456 in FIG. 6) may be aligned with a central axis of a through-hole of the lens holder. When light enters the lens system in a first direction (e.g., the direction 12 of FIG. 1), the lenses constituting the lens system may have greater diameters as its direction is closer to the first direction. Accordingly, an outer peripheral diameter of the barrel may also increase as its direction is closer to the first direction. Hereinafter, for convenience of explanation, a direction opposite to the first direction is defined as an upward direction. Since a lower portion of the barrel is greater than an upper portion and a through-hole of the upper plate of the lens holder has a size corresponding to the upper portion of the barrel, the lens assembly shall be inserted primarily in a direction from the bottom to top of the lens assembly. For example, the lens assembly may be coupled to the lens holder after being primarily located in a space surrounded by the upper plate and the sidewall of the lens holder.

According to an embodiment, in operation 902, the first lens assembly and the second lens assembly may be located in a space surrounded by the upper plate and the sidewall. The first lens assembly and the second lens assembly may be respectively aligned with the first through-hole and second through-hole of the upper plate.

According to an embodiment, in operation 903, the lens assembly may be joined to the through hole of lens holder. When the lens assembly is joined to the lens holder in operation 903, the lens assembly may be in a state of being movably joined to the lens holder. The lens assembly may be in a state of being movably joined to the lens holder along an optical axis (e.g., the optical axes 446 and 456 of FIG. 6). Accordingly, a distance interval between the lens assembly and the image sensor may be adjusted. For example, the lens assembly may be screw-coupled to the through-hole. The lens assembly may include a male thread at an upper portion, and a corresponding through-hole of the upper plate may include a female thread corresponding to the male thread. When the lens assembly rotates with respect to the lens holder, the lens assembly may move in a direction of an optical axis (e.g., the optical axes 446 and 456 of FIG. 6) of the lens assembly.

1000-1 of FIG. 10 corresponds to an example of operations 901, 902 and 903. In an embodiment, lens assemblies 440 and 450 may be assembled to a lens holder 460. Referring to FIG. 7 together, the through-holes 463 and 464 of the lens holder have a shape corresponding to upper sidewalls of the barrels 442 and and the lower sidewalls 442*b*-2 and 452*b*-2 of the barrels 442 and 452 have greater diameters than the upper sidewalls 442*b*-1 and 452*b*-1. Therefore, the lens assemblies 440 and 450 may be inserted into the lens holder 460 from a lower side of the lens holder 460 and then may be assembled to the through-holes 463 and 464 of the lens holder 460. When the lens assemblies 440 and 450 are assembled to the lens holder 460, the first male thread 443 of the first lens assembly 440 may be accommodated in the first female thread 465 of the first through-hole 463, and the second male thread 453 of the second lens assembly may be accommodated in the second female thread 466 of the second through-hole 464.

According to an embodiment, in operation 903*a*, an optical filter (e.g., the optical filter 470 of FIG. 7) may be attached to the lens holder. The lens holder may include a stepped portion (e.g., the stepped portion 467 of FIG. 7) inside the sidewall, and the optical filter may be attached to the stepped portion. When the optical filter is attached, the optical filter may be disposed below the lens assembly coupled to the lens holder. In an embodiment, the optical filter may be omitted. 1000-2 of FIG. 10 illustrates an example of operation 903*a*. After the lens assemblies 440 and 450 are assembled to the through-holes 463 and 464 of the lens holder 460, the optical filter 470 may be attached to the lens holder 460. For example, the optical filter 470 may be attached to the lens holder 460 using an adhesive.

According to an embodiment, in operation 904, the lens holder may be coupled to a PCB (e.g., the PCB 410 of FIG. 5). For example, a bottom face of the sidewall of the lens holder may be mounted on the PCB. The lens holder may be coupled to the PCB so that the lens assembly coupled to the lens holder is aligned with an image sensor (e.g., the first image sensor 420 and second image sensor 430 of FIG. 5) mounted on the PCB. For example, the first lens assembly and the second lens assembly may be coupled on the PCB so as to be aligned respectively with the first image sensor and second image sensor mounted on the PCB. 1000-3 of FIG. 10 illustrates an example of operation 904. In an embodiment, the lens holder 460 including the lens assemblies 440 and 450 and/or the optical filter 470 may be coupled to the PCB 410. The lens holder 460 may be coupled to the PCB 410 so that the lens assemblies 440 and 450 are aligned respectively with the image sensors 420 and 430 mounted on the PCB 410. When the lens holder 460 is attached to the PCB 410, a lens axis (e.g., the optical axis 446 of FIG. 6) of the first lens assembly 440 may be aligned with a center of the first image sensor 420, and a lens axis (e.g., the optical axis 456 of FIG. 6) of the second lens assembly 450 may be aligned with a center of the second image sensor 430.

According to an embodiment, in operation 905, a distance between the lens assemblies 440 and 450 and the image sensors 420 and 430 on the PCB may be adjusted. A distance between the lens assembly and the image sensor may be adjusted so that the image sensor is located at a focal distance of the lens assembly in a camera of a fixed focus type. 1000-4 of FIG. 10 illustrates an example of operation 905. In an embodiment, after the lens holder 460 is assembled on the PCB 410, a distance between the lens assemblies 440 and 450 and the image sensors 420 and 430 may be adjusted. By adjusting the distance between the lens assemblies 440 and 450 and the image sensors 420 and 430, a focus of the lens assemblies 440 and 450 may be matched to a sensor face of the image sensors 420 and 430. In an embodiment, the lens assemblies 440 and 450 may be screw-coupled to the lens holder 460, and a tool (e.g., a jig) may be used to rotate the lens assemblies 440 and 450 with respect to the lens holder 460, so that the lens assemblies 440 and 450 move in an arrow direction A with respect to the image sensors 420 and 430. For example, when the jig is engaged with the jig accommodating portion constructed at the lens assemblies 440 and 450 and the jig is rotated, the lens assemblies 440 and 450 may move in the arrow direction A with respect to the image sensors 420 and 430 while rotating together with the jig.

According to an embodiment, in operation 906, the lens assembly may be fixed to the lens holder. Referring to FIG. 10, after the distance between the lens assembly and the image sensor is adjusted, an adhesive may be applied to at least part of a gap 480 between the lens assemblies 440 and 450 and the lens holder 460. The lens assemblies 440 and 450 may be firmly coupled to the lens holder 460 using the adhesive. Accordingly, the distance between the lens assemblies 440 and 450 and the image sensors 420 and 430 may be maintained.

Figure 11:
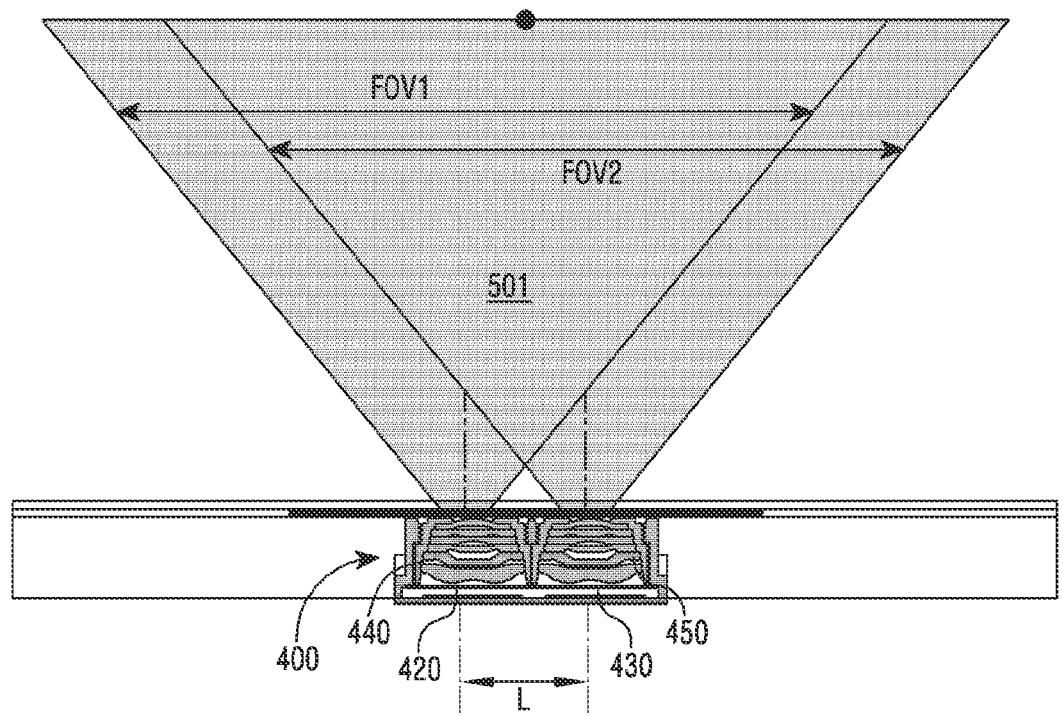
FIG. 11 is a diagram illustrating a Field Of View (FOV) of a camera module including two image sensors according to various embodiments.

FIG. 11 is a diagram illustrating an example of a Field Of View (FOV) of a camera module 400 including two image sensors 420 and 430 according to various embodiments.

In an embodiment, the camera module 400 may include a plurality of cameras (e.g., a dual camera). A first camera may use the first image sensor 420 to collect light transmitted through a first lens assembly 440, and a second camera may use the second image sensor 430 to collect light transmitted through a second lens assembly 450.

In an embodiment, at least part of an FOV of the first camera (hereinafter, an FOV1) and at least part of an FOV of the second camera (hereinafter, an FOV2) may overlap. A subject located in a region 501 in which the FOV1 and the FOV2 overlap may be captured substantially by two cameras. For example, a dual camera may obtain more image data in the overlapping region 501, compared to a non-overlapping region. For example, the camera module 400 may obtain an image with relatively high quality when a subject is located in the overlapping region 501.

In an embodiment, the first image sensor 420 may be a Red, Green, Blue (RGB) image sensor for obtaining a color image, and the second image sensor may be a mono image sensor for obtaining a monochrome image. In this case, the first image sensor 420 may include a color filter, and the second image sensor 430 may not include the color filter. The mono image sensor does not include a color filter, and thus may have higher light-receiving efficiency than the RGB image sensor. The electronic device 100 may synthesize an image obtained by the mono image sensor and an image obtained by the RGB image sensor to obtain a color image having relatively good quality even at low illumination. For example, the electronic device 100 may obtain the color image and the mono image respectively through the RGB sensor and the mono sensor, and may improve brightness of the color image, based on the mono image. For example, the electronic device 100 may use the color image and the mono image to perform image processing (e.g., image registration or image warping). In addition, the electronic device 100 may use color information of the color image and guidance information through a guided filter of the mono image to obtain an image in which brightness of the color image is improved.

The shorter the distance L (e.g., a base line) between a lens axis of a first camera and a lens axis of a second camera, the greater the FOV region 501 shared by the first camera and the second camera. That is, the shorter the distance between the lens axis of the first lens assembly 440 and the axis lens of the second lens assembly 450, the higher the quality of the image obtained by the camera module 400.

The camera module 400 according to an embodiment is configured to minimize and/or reduce a gap between the lens assemblies 440 and 450. This allows an FOV1, i.e., an FOV of the first camera, to overlap an FOV2, i.e., an FOV of the second camera, as much as possible. According to an embodiment, an increase in the overlapping region 501 may lead to an increase in a portion that can be used for image synthesis in data obtained from each camera, so that the camera module 400 can obtain an image with relatively good quality.

In an embodiment, the camera module 400 may correspond to the camera module 1380 of FIG. 13 described below. In an embodiment, the camera module may include the same or similar components as those of the camera module 1380.

Figure 12:
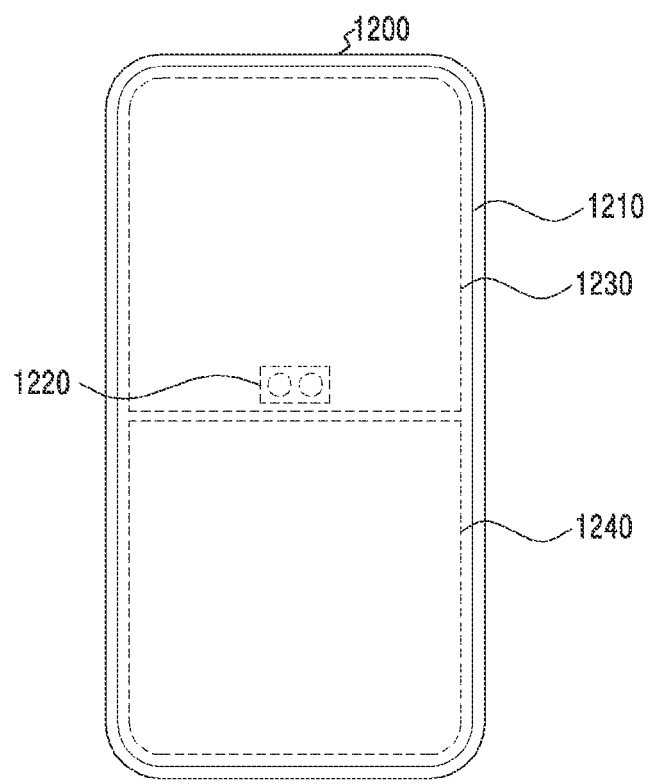
FIG. 12 is a diagram illustrating a camera module disposed in an electronic device according to various embodiments.

FIG. 12 is a diagram illustrating an example in which a camera module is disposed to an electronic device according to various embodiments.

Referring to FIG. 12, an electronic device 1200 may include a display 1210, a camera module 1220, a PCB 1230, and a battery 1240, and without being limited thereto, may further include other components.

In an embodiment, the camera module 1220 may be disposed below the display 1210. For example, an Under Display Camera (UDC) may be included.

In an embodiment, the camera module 1220 may be located at a center portion of the display 1210. For example, the camera module 1220 may include a plurality of cameras, and may be disposed at a center portion below the display 1210. As another example, the camera module 1220 may be disposed to a region adjacent to the battery 1240 on the PCB 1230.

In an embodiment, since the camera module 1220 is located at a center portion of the electronic device 1200, a natural user interface may be provided when a user takes a selfie or makes a video call.

In an embodiment, regarding an image sensor included in the camera module 1220 located at the center portion of the display 1210, the number of pixels of the display 1210 may be increased and transparency may be reduced, compared to the conventional display. In addition, when camera quality is compensated through the plurality of cameras, there may be an advantage in that image quality is improved.

In an embodiment, the electronic device 1200 of FIG. 12 may correspond to the electronic device 1301 of FIG. 13 described below. In an embodiment, the electronic device 1200 may include the same or similar components as those included in the electronic device 1301.

In an embodiment, the camera module 1220 may correspond to the camera module 1380 of FIG. 13 described below. In an embodiment, the camera module 1220 may include the same or similar components as those included in the camera module 1380.

Figure 13:
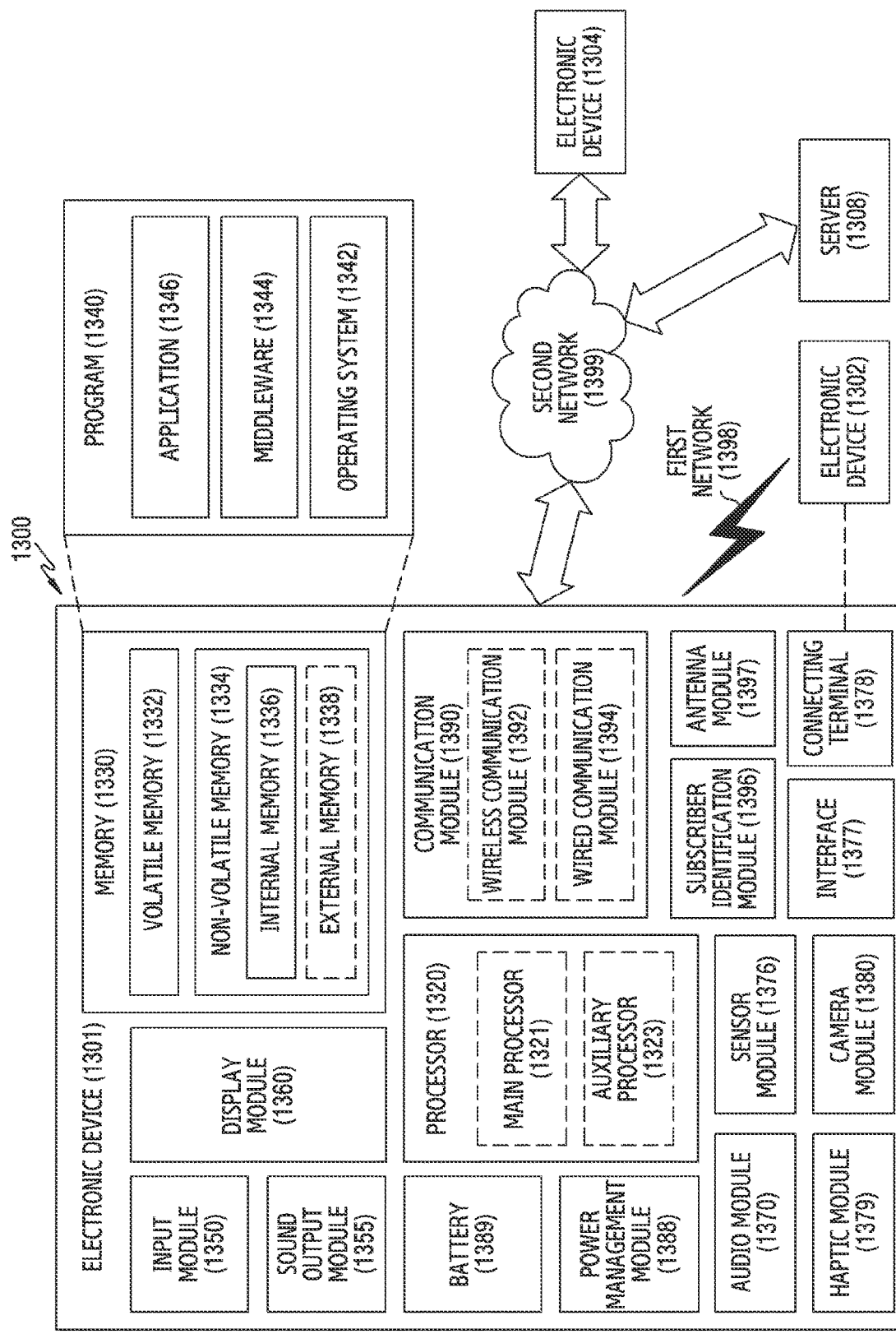
FIG. 13 is a block diagram illustrating an example electronic device in a network environment according to various embodiments.

FIG. 13 is a block diagram illustrating an example electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In various embodiments, at least one of the components (e.g., the connecting terminal 1378) may be omitted from the electronic device 1301, or one or more other components may be added in the electronic device 1301. In various embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to an embodiment, as at least part of the data processing or computation, the processor may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory may include the volatile memory 1332 or the non-volatile memory 1334. The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to an embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element including a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device via the server 1308 coupled with the second network 1399. Each of the electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In an embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

A camera module (e.g., the camera module 400) according to an example embodiment of the disclosure may include: a Printed Circuit Board (PCB) (e.g., the PCB 410), a first image sensor (e.g., the first image sensor 420) and a second image sensor (e.g., the second image sensor 430) disposed on the PCB (e.g., the PCB 410), a lens holder (e.g., the lens holder 460) having an upper plate (e.g., the upper plate 460a) facing and spaced apart from the PCB (e.g., the PCB 410) and a sidewall extending from an edge of the upper plate (e.g., the upper plate 460a) toward the PCB (e.g., the PCB 410). The upper plate (e.g., the upper plate 460a) may include a first through-hole and a second through-hole aligned to the first image sensor (e.g., the first image sensor 420) and the second image sensor (e.g., the second image sensor 430), respectively, a first lens assembly including a first lens system and a first barrel accommodating the first lens system, and assembled to the first through-hole to be aligned with the first image sensor (e.g., the first image sensor 420), and a second lens assembly including a second lens system and a second barrel accommodating the second lens system, and assembled to the second through-hole to be aligned with the second image sensor (e.g., the second image sensor 430). The first barrel may include a first sidewall coupled to the first through-hole and a second sidewall having a greater diameter than the first sidewall and located between the first through-hole and the first image sensor (e.g., the first image sensor 420). The second barrel may include a third sidewall to be coupled to the second through-hole and a fourth sidewall having a greater diameter than the third sidewall and located between the second through-hole and the second image sensor (e.g., the second image sensor 430).

In the camera module (e.g., the camera module 400) according to an example embodiment of the disclosure, when the first lens assembly and the second lens assembly are assembled to the lens holder (e.g., the lens holder 460), a gap between the first sidewall and the third sidewall may be greater than a gap between the second sidewall and the fourth sidewall.

In the camera module (e.g., the camera module 400) according to an example embodiment of the disclosure, when the first lens assembly and the second lens assembly are assembled to the lens holder (e.g., the lens holder 460), a portion of the upper plate (e.g., the upper plate 460a) may exist between the first sidewall and the third sidewall, and an air gap may exist between the second sidewall and the fourth sidewall.

In the camera module (e.g., the camera module 400) according to an example embodiment of the disclosure, the lens holder (e.g., the lens holder 460) may include a first female thread on an inner circumferential face of the first through-hole and a second female thread on an inner circumferential face of the second through-hole. The first barrel may include a first male thread corresponding to the first female thread on an outer circumferential face of the first sidewall. The second barrel may include a second male thread corresponding to the second female threshold on an outer circumferential face of the third sidewall.

In the camera module (e.g., the camera module 400) according to an example embodiment of the disclosure, the first barrel or the second barrel may include at least one jig accommodating portion exposed through the first through-hole or the second through-hole.

The camera module (e.g., the camera module 400) according to an example embodiment of the disclosure may further include an adhesive applied to at least part of a gap between the first lens assembly and the first through-hole and/or at least part of a gap between the second lens assembly and the second through-hole, when the first lens assembly and the second lens assembly are assembled to the lens holder (e.g., the lens holder 460).

The camera module (e.g., the camera module 400) according to an example embodiment of the disclosure may further include a filter attached to the lens holder (e.g., the lens holder 460) and disposed between the first image sensor and the first lens assembly and between the second image sensor and the second lens assembly.

In the camera module (e.g., the camera module 400) according to an example embodiment of the disclosure, the filter may include a transparent portion corresponding to the first image sensor and the second image sensor (e.g., the second image sensor 430), and an opaque portion surrounding at least part of an edge of the transparent portion.

In the camera module (e.g., the camera module 400) according to an example embodiment of the disclosure, the first image sensor (e.g., the first image sensor 420) may comprise a Red-Green-Blue (RGB) image sensor, and the second image sensor (e.g., the second image sensor 430) may comprise a mono image sensor.

An electronic device according to an example embodiment of the disclosure may include: a housing, and a camera module (e.g., the camera module 400) disposed inside the housing configured to receive light through at least part of the housing. The camera module (e.g., the camera module 400) may include a printed circuit board (PCB) (e.g., the PCB 410), a first image sensor (e.g., the first image sensor 420) and a second image sensor (e.g., the second image sensor 430) disposed on the PCB (e.g., the PCB 410), a lens holder (e.g., the lens holder 460) having an upper plate (e.g., the upper plate 460a) facing and spaced apart from the PCB (e.g., the PCB 410) and a sidewall extending from an edge of the upper plate toward the PCB (e.g., the PCB 410). The upper plate (e.g., the upper plate 460a) may include a first through-hole and a second through-hole aligned to the first image sensor (e.g., the first image sensor 420) and the second image sensor (e.g., the second image sensor 430), respectively, a first lens assembly including a first lens system and a first barrel accommodating the first lens system, and assembled to the first through-hole to be aligned with the first image sensor (e.g., the first image sensor 420), and a second lens assembly including a second lens system and a second barrel accommodating the second lens system, and assembled to the second through-hole to be aligned with the second image sensor (e.g., the second image sensor 430). The first barrel may include a first sidewall coupled to the first through-hole and a second sidewall having a greater diameter than the first sidewall and located between the first through-hole and the first image sensor (e.g., the first image sensor 420). The second barrel may include a third sidewall coupled to the second through-hole and a fourth sidewall having a greater diameter than the third sidewall and located between the second through-hole and the second image sensor (e.g., the second image sensor 430).

In the electronic device according to an example embodiment of the disclosure, when the first lens assembly and the second lens assembly are assembled to the lens holder (e.g., the lens holder 460), a gap between the first sidewall and the third sidewall may be greater than a gap between the second sidewall and the fourth sidewall.

In the electronic device according to an example embodiment of the disclosure, when the first lens assembly and the second lens assembly are assembled to the lens holder (e.g., the lens holder 460), portion of the upper plate (e.g., the upper plate 460a) may exist between the first sidewall and the third sidewall, and an air gap may exist between the second sidewall and the fourth sidewall.

In the electronic device according to an example embodiment of the disclosure, the lens holder (e.g., the lens holder 460) may include a first female thread on an inner circumferential face of the first through-hole and a second female thread on an inner circumferential face of the second through-hole. The first barrel may include a first male thread corresponding to the first female thread on an outer circumferential face of the first sidewall. The second barrel may include a second male thread corresponding to the second female threshold on an outer circumferential face of the third sidewall.

In the electronic device according to an example embodiment of the disclosure, the first barrel or the second barrel may include at least one jig accommodating portion exposed through the first through-hole or the second through-hole.

The electronic device according to an example embodiment of the disclosure may further include an adhesive applied to at least part of a gap between the first lens assembly and the first through-hole and/or at least part of a gap between the second lens assembly and the second through-hole, when the first lens assembly and the second lens assembly are assembled to the lens holder (e.g., the lens holder 460).

A method of manufacturing a camera module (e.g., the camera module 400) according to an example embodiment of the disclosure may include: providing a lens holder (e.g., the lens holder 460) including an upper plate (e.g., the upper plate 460*a*) including a first through-hole and a second through-hole and a sidewall extending from an edge of the upper plate (e.g., the upper plate 460*a*) in a direction substantially vertical to the upper plate (e.g., the upper plate 460*a*), locating a first lens assembly and a second lens assembly in a space surrounded by the upper plate (e.g., the upper plate 460*a*) and the sidewall, coupling the first lens assembly and the second lens assembly to the first through-hole and second through-hole of the upper plate (e.g., the upper plate 460*a*), respectively, coupling a bottom face of the sidewall on the PCB (e.g., the PCB 410) so that the first lens assembly and the second lens assembly are aligned with a first image sensor (e.g., the first image sensor 420) and second image sensor (e.g., the second image sensor 430), respectively, mounted on the PCB (e.g., the PCB 410), and adjusting a distance between the lens assemblies and the image sensors mounted on the PCB (e.g., the PCB 410).

In the method of manufacturing the camera module (e.g., the camera module 400) according to an example embodiment of the disclosure, the lens assemblies may be screw-coupled to the through-hole. The distance between the lens assemblies and the image sensors may be adjusted by rotating the lens assembly in accordance with a thread with respect to the lens holder (e.g., the lens holder 460).

In the method of manufacturing the camera module (e.g., the camera module 400) according to an example embodiment of the disclosure, the lens assembly may include a jig accommodating portion. The distance between the lens assembly and the image sensor may be adjusted by moving the lens assembly with respect to the lens holder using a tool that can be inserted in part to the jig accommodating portion.

The method of manufacturing the camera module (e.g., the camera module 400) according to an example embodiment of the disclosure may further include applying an adhesive member to a gap between the lens assembly and the through-hole, after the distance between the lens assembly and the image sensor is adjusted.

The method of manufacturing the camera module (e.g., the camera module 400) according to an example embodiment of the disclosure may further include attaching an optical filter to the lens holder (e.g., the lens holder 460) after the first lens assembly and the second lens assembly are coupled to the lens holder (e.g., the lens holder 460). When the lens holder (e.g., the lens holder 460) mounted on the PCB (e.g., the PCB 410), the optical filter may be located between the lens assembly and the image sensor.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A camera module comprising:
   a Printed Circuit Board (PCB);
   a first image sensor and a second image sensor disposed on the PCB;
   a lens holder having an upper plate facing and spaced apart from the PCB and a sidewall extending from an edge of the upper plate toward the PCB, wherein the upper plate comprises a first through-hole and a second through-hole aligned to the first image sensor and the second image sensor, respectively;
   a first lens assembly comprising a first lens system and a first barrel accommodating the first lens system, and assembled to the first through-hole to be aligned with the first image sensor;
   a second lens assembly comprising a second lens system and a second barrel accommodating the second lens system, and assembled to the second through-hole to be aligned with the second image sensor; and
   a filter attached to the lens holder and disposed between at least the first image sensor and the first lens assembly and between at least the second image sensor and the second lens assembly,
   wherein the first barrel comprises a first sidewall coupled to the first through-hole and a second sidewall having a greater diameter than the first sidewall and located between the first through-hole and the first image sensor, and the second barrel comprises a third sidewall coupled to the second through-hole and a fourth sidewall having a greater diameter than the third sidewall and located between the second through-hole and the second image sensor.

2. The camera module of claim 1, wherein, when the first lens assembly and the second lens assembly are assembled to the lens holder, a gap between the first sidewall and the third sidewall is greater than a gap between the second sidewall and the fourth sidewall.

3. The camera module of claim 1, wherein, when the first lens assembly and the second lens assembly are assembled to the lens holder, a portion of the upper plate exists between the first sidewall and the third sidewall, and an air gap exists between the second sidewall and the fourth sidewall.

4. The camera module of claim 1,
   wherein the lens holder comprises a first female thread on an inner circumferential face of the first through-hole and a second female thread on an inner circumferential face of the second through-hole,
   wherein the first barrel comprises a first male thread corresponding to the first female thread on an outer circumferential face of the first sidewall, and
   wherein the second barrel comprises a second male thread corresponding to the second female thread on an outer circumferential face of the third sidewall.

5. The camera module of claim 4, wherein the first barrel or the second barrel comprises at least one jig accommodating portion exposed through the first through-hole or the second through-hole.

6. The camera module of claim 1, further comprising an adhesive applied to at least a portion between the first lens assembly and the lens holder and/or at least a portion between the second lens assembly and the lens holder, when the first lens assembly and the second lens assembly are assembled to the lens holder.

7. The camera module of claim 1, wherein the filter comprises a transparent portion corresponding to the first image sensor and the second image sensor, and an opaque portion surrounding at least part of an edge of the transparent portion.

8. The camera module of claim 1, wherein the first image sensor comprises a Red-Green-Blue (RGB) image sensor, and the second image sensor comprises a mono image sensor.

9. An electronic device comprising:
   a housing; and
   a camera module disposed inside the housing and configured to receive light through at least part of the housing,
   wherein the camera module comprises:
   a Printed Circuit Board (PCB);
   a first image sensor and a second image sensor disposed on the PCB;
   a lens holder having an upper plate facing and spaced apart from the PCB and a sidewall extending from an edge of the upper plate toward the PCB, wherein the upper plate comprises a first through-hole and a second through-hole aligned to the first image sensor and the second image sensor, respectively;
   a first lens assembly comprising a first lens system and a first barrel accommodating the first lens system, and assembled to the first through-hole to be aligned with the first image sensor
   a second lens assembly comprising a second lens system and a second barrel accommodating the second lens system, and assembled to the second through-hole to be aligned with the second image sensor; and
   a filter attached to the lens holder and disposed between at least the first image sensor and the first lens assembly and between at least the second image sensor and the second lens assembly,
   wherein the first barrel comprises a first sidewall coupled to the first through-hole and a second sidewall having a greater diameter than the first sidewall and located between the first through-hole and the first image sensor, and the second barrel comprises a third sidewall coupled to the second through-hole and a fourth sidewall having a greater diameter than the third sidewall and located between the second through-hole and the second image sensor.

10. The electronic device of claim 9, wherein, when the first lens assembly and the second lens assembly are assembled to the lens holder, a gap between the first sidewall and the third sidewall is greater than a gap between the second sidewall and the fourth sidewall.

11. The electronic device of claim 9, wherein, when the first lens assembly and the second lens assembly are assembled to the lens holder, portion of the upper plate exists between the first sidewall and the third sidewall, and an air gap exists between the second sidewall and the fourth sidewall.

12. The electronic device of claim 11,
    wherein the lens holder comprises a first female thread on an inner circumferential face of the first through-hole and a second female thread on an inner circumferential face of the second through-hole,
    wherein the first barrel comprises a first male thread corresponding to the first female thread on an outer circumferential face of the first sidewall, and
    wherein the second barrel comprises a second male thread corresponding to the second female thread on an outer circumferential face of the third sidewall.

13. The electronic device of claim 12, wherein the first barrel or the second barrel comprises at least one jig accommodating portion exposed through the first through-hole or the second through-hole.

14. The electronic device of claim 9, further comprising an adhesive applied to at least a portion between the first lens assembly and the lens holder and/or at least a portion between the second lens assembly and the lens holder, when the first lens assembly and the second lens assembly are assembled to the lens holder.

\* \* \* \* \*